(12) United States Patent
Cong et al.

(10) Patent No.: US 8,819,346 B2
(45) Date of Patent: Aug. 26, 2014

(54) FAST PREDICTION OF SHARED MEMORY ACCESS PATTERN

(75) Inventors: Guojing Cong, Ossining, NY (US); Ettore Tiotto, Whitby, CA (US); Hui-Fang Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/416,331

(22) Filed: Mar. 9, 2012

(65) Prior Publication Data
US 2013/0238862 A1 Sep. 12, 2013

(51) Int. Cl.
*G06F 12/00* (2006.01)

(52) U.S. Cl.
USPC .......................... 711/147; 711/114; 711/202

(58) Field of Classification Search
CPC . G06F 15/17331; G06F 9/46; G06F 11/0709; G06F 17/30194; G06F 12/00
See application file for complete search history.

(56) References Cited

U.S. PATENT DOCUMENTS

| | | | |
|---|---|---|---|
| 7,921,261 B2 | 4/2011 | Blackmore et al. | |
| 7,925,842 B2 | 4/2011 | Arimilli et al. | |
| 2005/0149903 A1 | 7/2005 | Archambault et al. | |
| 2006/0143350 A1* | 6/2006 | Miloushev et al. | 710/242 |

OTHER PUBLICATIONS

Sbaraglia et al., "pSigma: An Infrastructure for Parallel Application Performance Analysis using Symbolic Specifications", Proc. of the sixth European Workshop on OpenMP, 2004.

Leko et al., "GASP: A Performance Analysis Tool Interface for Global Address Space Programming Models", Version 1.5, Sep. 14, 2006, Lawrence Berkeley National Lab Report LBNL-61606.
"Code Optimization with the IBM XL Compilers", 2010 IBM Corporation.
Kirker et al., "Unified Parallel C UPC on HPCx", Jan. 14, 2008, HPC Capability Computing.
Cong et al., "Tool-Assisted Performance Measurements and Tuning Applications", PGAS 2011: Fifth Conference on Partitioned Global Address Space Programming Models, Oct. 15-18, 2011.
Gheith et al., "Shared Memory RAM Disk for a Cluster with Shared Memory", OIP.com, Jun. 1, 1993, http://www.ip.com/pubview/IPCOM000105104D.
Gheith et al., "Shared Virtual Disk for a Cluster of Processors with Separate I/O Devices and Shared Memory", OIP.com, Jun. 1, 1993, http://www.ip.com/pubview/IPCOMM000105136D.
Bindel, "Lecture 10: Unified Parallel C", Sep. 29, 2011.
Sarkar, "Unified Parallel C (contd)", COMP 422 Lecture 22, Apr. 1, 2008.

* cited by examiner

*Primary Examiner* — Shawn X Gu
(74) *Attorney, Agent, or Firm* — Harrington & Smith (57) ABSTRACT

A computer implemented method analyzes shared memory accesses during execution of an application program. The method includes instrumenting events of shared memory accesses in the application program, where the application program is to be executed on a target configuration having p nodes; executing the application program using p1 processing nodes, where p1 is less than p and satisfies a constraint. For accesses made by the executing application program, the method determines a target thread and maps determined target threads to either a remote node or a local node corresponding to a remote memory access and to a local memory access, respectively. Also disclosed is a computer-readable storage medium that stores a program of executable instructions that implements the method, and a data processing system. The invention can be implemented using a language such as Unified Parallel C (UPC) directed to a partitioned global address space (PGAS) paradigm.

21 Claims, 4 Drawing Sheets

| Configuration sp.S.O0.16 (16 threads) | Time for Real Run (sec) | Time to use the prediction tool (sec) |
|---|---|---|
| NODES=4 | 373.81 | 27.41 |
| NODES=8 | 1042.08 | 23.33 |
| Remote # when NODES=4 remote_count: local_count: | [0]=169600 [0]=5924800 | [1]=153400 [1]=5565200 | [2]=154400 [2]=5545200 |
| Remote # when NODES=8 remote_count: local_count: | [0]=215800 [0]=5878600 | [1]=153400 [1]=5565200 | [2]=189600 [2]=5510000 |

| Configuration cg.S.O0.4 (4 threads) | Time for Real Run (sec) | Time to use the prediction tool (sec) |
|---|---|---|
| NODES=2 | 9.57 | 3.75 |
| NODES=4 | 35 | 3.42 |
| Remote # when NODES=2 remote_count: local_count: | [0]=0 [0]=1461956 | [1]=832 [1]=1461124 | [2]=832 [2]=1461124 |
| Remote # when NODES=4 remote_count: local_count: | [0]=292896 [0]=1169060 | [1]=293728 [1]=1168228 | [2]=293728 [2]=1168228 |

FAST PREDICTION OF SHARED MEMORY ACCESS PATTERN

STATEMENT OF GOVERNMENT RIGHTS

This invention was made with Government support under Contract No.: HR0011-07-9-0002 awarded by Defense Advanced Research Projects Agency (DARPA). The Government has certain rights in this invention.

TECHNICAL FIELD

The exemplary embodiments of this invention relate generally to computer programs, to computer program compilers, to parallel program languages that have a notion of shared memory across a plurality of processing nodes such as a type of programming language known as a partitioned global address space (PGAS) paradigm and, for example, to one related type of programming language known as Unified Parallel C (UPC), and to tools for use with such programming languages.

BACKGROUND

The Unified Parallel C (UPC) is a language implementation of the partitioned global address space (PGAS) paradigm that has been proposed as a productivity feature for high performance computing systems. The PGAS paradigm presents a shared-memory abstraction for programming distributed-memory machines. PGAS languages improve ease of programming and also provide leverage to a programmer to tune a program to achieve higher performance. PGAS can be assumed to be a viable programming model for massively parallel computers as it utilizes threads so that the amount of memory per thread is usable, as opposed to processes as in the Message Passing Interface (MPI) paradigm.

Figure 1:
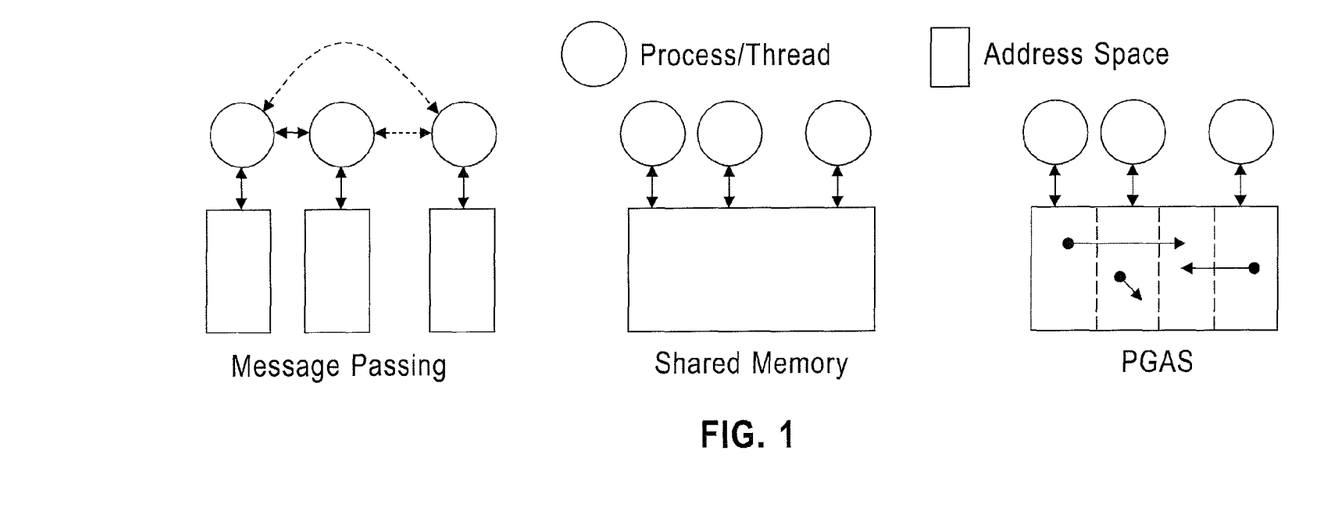
FIG. 1 illustrates a distinction between a MPI paradigm, a shared memory paradigm and a PGAS paradigm.

FIG. 1 illustrates a distinction between the MPI paradigm, a shared memory paradigm and the PGAS paradigm (e.g., as represented by UPC). In the PGAS paradigm computation is performed in multiple places, where a place contains data that can be operated on remotely. Data lives in the place it was created, for its lifetime. A datum in one place may point to a datum in another place. Data-structures (e.g., arrays) may be distributed across many places. Places may have different computational properties (mapping to a hierarchy of compute engines). In general a place expresses locality.

PGAS programming languages offer a high-productivity programming model for parallel programming. PGAS languages, such as UPC, combine the simplicity of shared-memory programming with the efficiency of a message-passing paradigm. The efficiency is obtained through a combination of factors: programmers declare how the data is partitioned and distributed between threads and use a single processor-multiple data (SPMD) programming model to define work; compilers can use the data annotations to optimize accesses and communication. One UPC compiler of interest herein is one known as an XL UPC Compiler available from the assignee of this patent application.

A PGAS language provides an explicitly parallel, shared-memory like programming model with a global addressable space that allows a programmer to declare and "directly" access data distributed across a machine. There is a partitioned address space where memory is logically partitioned between local and remote (a two-level memory hierarchy). The PGAS language uses the single processor-multiple data (SPMD) execution model wherein all threads of control execute the same program and where the number of threads is (typically) fixed at startup.

In UPC the programmer works with a single shared, partitioned address space. In this address space variables can be directly read and written by any processor, but each variable is physically associated with a single processor. UPC uses the SPMD computational model wherein an amount of parallelism is fixed at program startup time, typically with a single thread of execution per processor.

SUMMARY

In one aspect thereof the exemplary embodiments of this invention provide a computer implemented method to analyze shared memory accesses during execution of an application program. The method comprises instrumenting events of shared memory accesses in the application program, where the application program is to be executed on a target configuration comprising p nodes; executing the application program using p1 processing nodes, where p1 is less than p and satisfies a constraint; and for accesses made by the executing application program, determining a target thread and mapping determined target threads to either a remote node or a local node corresponding to a remote memory access and to a local memory access, respectively.

In another aspect thereof the exemplary embodiments of this invention provide a computer-readable storage medium that stores a program of executable instructions. The execution of the program results in performing operations that comprise instrumenting events of shared memory accesses in an application program, where the application program is to be executed on a target configuration comprising p nodes; executing the application program using p1 processing nodes, where p1 is less than p and satisfies a constraint; and for accesses made by the executing application program, determining a target thread and mapping determined target threads to either a remote node or a local node corresponding to a remote memory access and to a local memory access, respectively.

In yet another aspect thereof the exemplary embodiments of this invention provide a data processing system comprising at least one processor connected with at least one memory that stores a program of executable instructions. Execution of the program by the at least one processor results in performing an operation that comprises instrumenting events of shared memory accesses of a compiled application program written in a programming language compliant with a partitioned global address space paradigm. The application program is intended to be executed on a target configuration comprising p nodes, and the events comprise read from shared memory and write to shared memory. Execution of the program by the at least one processor further results in performing an operation of executing the application program using p1 processing nodes, where p1 is less than p and satisfies a constraint and, for those accesses made by the executing application program, determining a target thread and mapping determined target threads to either a remote node or a local node corresponding to a remote memory access and to a local memory access, respectively.

DETAILED DESCRIPTION

One publication of interest herein is "Tool-assisted performance measurement and tuning of PGAS applications", Guojing Cong, Hui-fang Wen, I-hsin Chung, Yasushi Negishi, Hiroki Murata, PGAS 2011: Fifth Conference on Partitioned Global Address Space Programming Models, Oct. 15-18, 2011.

The PGAS paradigm provides a shared-memory abstraction for programming distributed-memory machines. While PGAS improves the ease of programming for the user it also makes it difficult for performance analysis to correlate runtime behavior to program constructs. As efficient remote memory access is critical to performance, understanding the communication pattern can bring insight for performance diagnosis and tuning by attributing communication cost to PGAS sources.

Mapping shared-memory algorithms onto distributed-memory machines with UPC can be straightforward. However, such an implementation can be very inefficient for large-scale irregular problems due to the communication cost of shared memory accesses. The UPC performance per processor can be much lower than that of a symmetric multiprocessing (SMP) implementation for the connected components algorithm.

The performance gap suggests that analyzing accesses to shared memory is critical to tuning UPC programs as the cost associated with remote accesses is high due to the long network latency and system software overhead. For some UPC codes, even when using the highly regular NAS benchmarks, untuned versions tend to issue a large number of remote accesses. Coupled with instrumentation overhead, one profiling run on a distributed memory machine can require a significant amount of time to collect memory access behavior. When remote access dominates the execution time, and in general, the larger the cluster the slower is the instrumented execution. It would thus be beneficial to the programmer if the remote access behavior of a PGAS program, such as a UPC program, on a large cluster could be rapidly predicted.

The examples of the embodiments of this invention enable the prediction of the remote access behavior of a PGAS program using a small configuration of nodes, or even using one single node. The method is especially applicable for those applications that do not change the algorithm according to the number of processors available, or that do not change the input so as fit into a smaller configuration.

In the embodiments of this invention the events of shared-memory accesses in a UPC application are instrumented. This can be achieved with compiled code (e.g., code compiled by the above-noted XL UPC compiler) by intercepting shared-memory access functions at level O0, or with GASP by registering such events with a GASP-conforming compiler.

Reference with regard to optimization level 0 (–O0) can be made to, for example, "Code optimization with the IBM XL Compilers", copyright IBM Corporation 2010. As is stated when using –O0 the XL compiler minimizes optimization transformations. Some limited optimization occurs at –O0 even if the programmer does not specify other optimization options. However, limited optimization analysis generally results in a quicker compile time than other optimization levels. –O0 is said to be the best optimization level for the programmer to specify when debugging code with a symbolic debugger.

Reference with regard to GASP can be made, for example, to "GASP: A Performance Analysis Tool Interface for Global Address Space Programming Models", Version 1.5 Author: Leko, Adam; Bonachea, Dan; Su, Hung-Hsun; George, Alan D.; Sherburne, Hans; Publication Date: Sep. 14, 2006, Lawrence Berkeley National Laboratory.

A next step is run the application (with a smaller input or with the input that it is meant to run with) on a small configuration of nodes (which can be a single node). According to the target configuration there is provided a mapping mechanism to map UPC threads to either remote or local nodes.

Note that one problem that is encountered is that shared memory accesses that are local (remote) on one configuration may be remote (local) on another configuration.

Assuming that an event is instrumented where a shared-memory access is performed, then for each access it is possible to capture the target UPC thread id through the instrumentation. According to the mapping mechanism a determination is made, for the target configuration, whether the access is local or remote. One significant advantage of this approach is that very fast profiling runs can be made while predicting the memory access behavior on a large configuration of nodes.

It can be noted that with many applications of interest, if the underlying algorithm does not change with the available number of processors, it can become possible to infer the behavior with a large set of inputs by studying the behavior with a smaller set of inputs. Reducing the input size can clearly reduce the execution time of profiling runs. However, the input size cannot be made arbitrarily small due to a number of constraints. In general, to perform an adequate performance study the input should be large enough to enable distinguishing those statistics that are proportional to the input size. Also the configuration for such a study needs to contain at least two nodes in order to study remote access behavior. Even with just two nodes, however, the remote access time can dominate the execution time. In addition, there are cases where the algorithm behavior is related to the level of available parallelism thereby further complicating the profiling of the application.

The example embodiments of this invention use an approach that can predict the remote access behavior for a large configuration of nodes by using a small configuration of nodes so as to reduce the performance study time.

Figure 2:
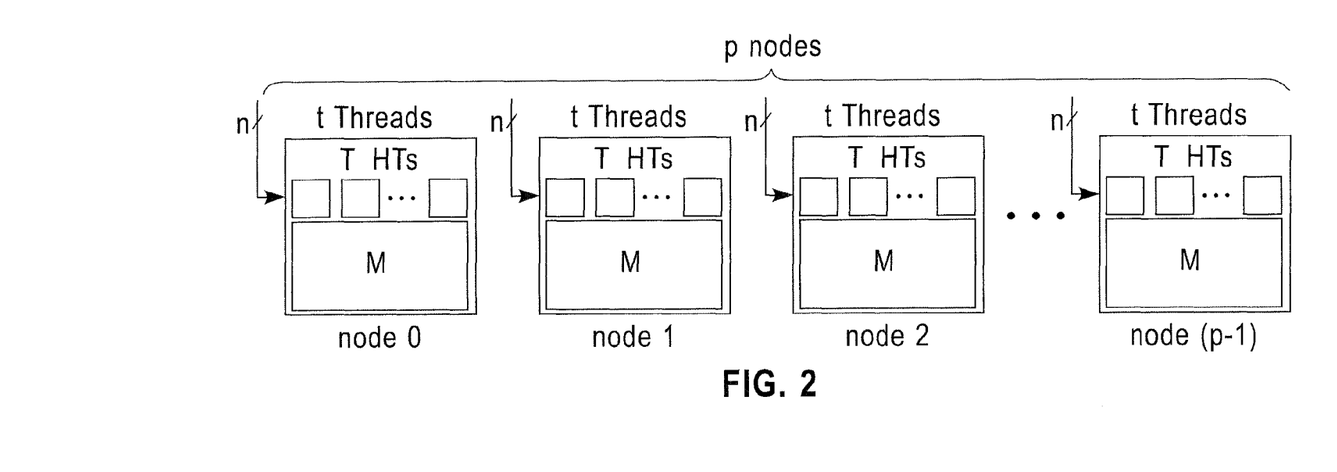
FIG. 2 depicts an exemplary and non-limiting target configuration for an application program, where the target configuration that has p nodes each using t threads, T processors or hardware threads (HTs), where a memory capacity of each node is M and where each node has an input size of n.

As a non-limiting assumption, and referring to FIG. 2, consider a target configuration for an application that has p nodes (node0, node1, . . . , node(p−1)), and each node uses t threads. Further assume that each node has T processors or hardware threads (HTs), that the memory capacity of each node is M, and that the input size to each node is n. Further assume that the input is evenly distributed amongst the T processors of each of the p nodes. The embodiments of this invention first find a suitable small configuration with p1 nodes, with each node running t1 procs/threads. It can be seen that n/p1<=M.

In general, creating too many threads on each node can have a significant negative impact on performance. It is preferred that t1<t*alpha where alpha is a constant and where * denotes multiplication. The method selects the minimal p1 that satisfies p1>n/M, p1*t1=p*t, and t1<t*alpha. P1 can be selected by either a user or by the tool itself.

Figure 3:
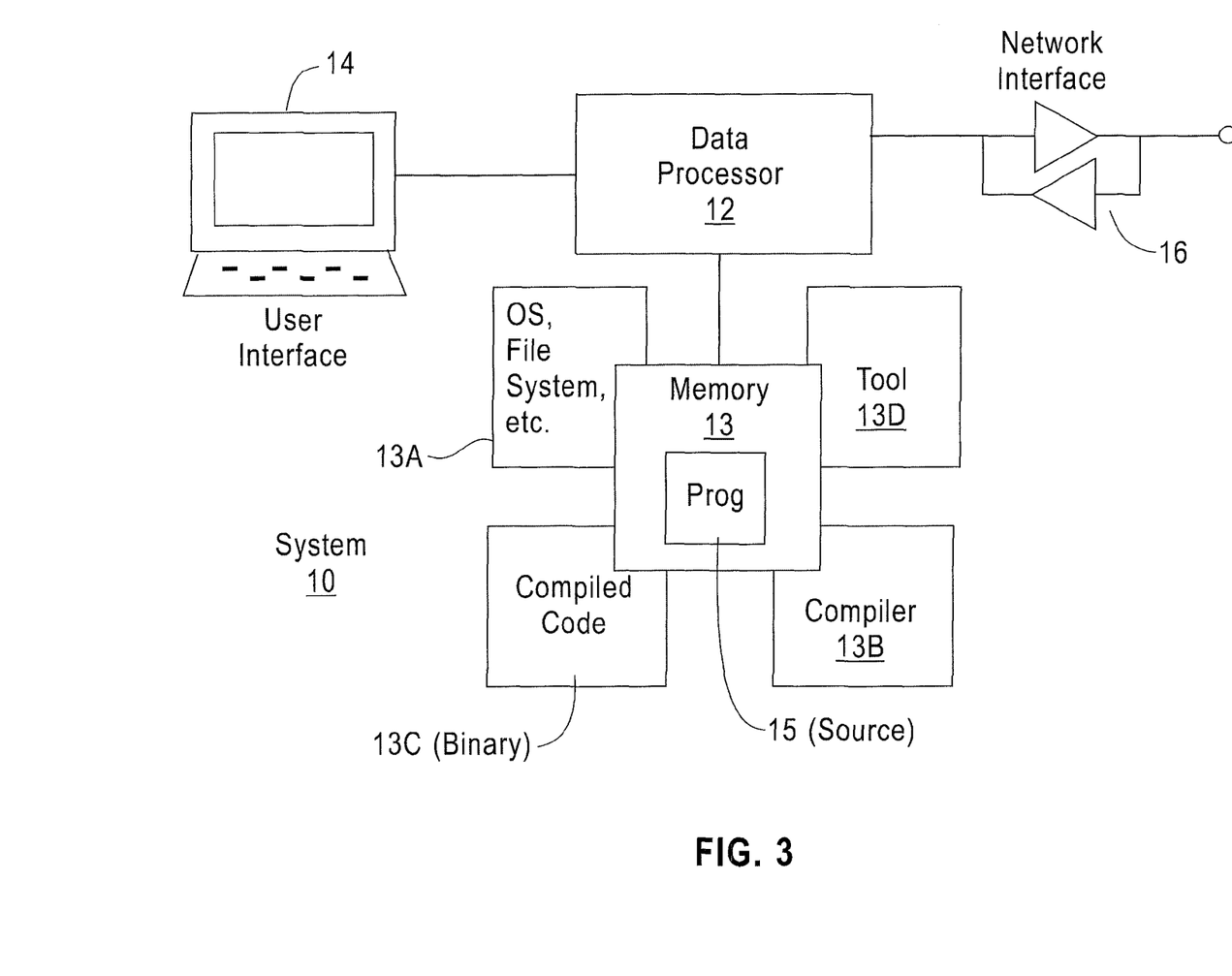
FIG. 3 shows a non-limiting embodiment of a computer system that can be used to implement and practice the embodiments of this invention, where a memory includes program instructions that implement a shared memory access prediction tool as described in detail below.

Reference is made briefly to FIG. 3 for showing a non-limiting embodiment of a computer system or data processing system 10 that can be used to implement and practice the embodiments of this invention. The system 10 includes at least one data processor 12 connected with at least one memory 13. The memory 13 stores data and programs, such as an operating system (OS) 13A and related programs such as a file system, etc. The memory 13 also stores an application program 15 (source code) written by a programmer or programmers using, for example, a local user interface 14 and/or a remote user interface via a suitable network interface 16. The application program 15 can be, for example, an application under development that is written in the UPC language (or in another language compatible with the PGAS paradigm). An exemplary target configuration for the application program 15 can be a network of nodes as shown in FIG. 2 and described above.

The memory 13 also stores a program that implements a compiler, such as a UPC compiler 13B, that produces compiled code 13C from the application program 15. One suitable compiler is the XL UPC Compiler that is available from the assignee of this patent application. The memory 13 can also store a further program that implements a tool 13D that operates in accordance with the exemplary embodiments of this invention. The tool 13D can be invoked by the programmer using, for example, the user interface 14. The tool 13D enables the programmer to at least analyze shared memory accesses by the application program 15.

Note that at least the tool 13D need not be instantiated in the memory 13, and could be resident on another system such as on another physical system connected through the network interface 16, or on a virtual system in a cloud computing environment. That is, the tool 13D need not be co-resident in the same memory as the compiler 13B and/or the compiled code 13C and/or the source code (application program) 15.

The method instruments the application program 15. In general, the proper instrumentation mechanism is dependent on the interface between the tool 13D and the target compiler 13B. In one non-limiting embodiment binary instrumentation is used (i.e., the code 13C compiled from the source program 15 is instrumented), although a GASP interface may also be used. The instrumentation captures at least two types of events: read from shared memory and write to shared memory (e.g., upc pointer assignment and upc pointer de-reference (and their variants) for the non-limiting case of the XL UPC Compiler 13B).

It is desirable that the compiler 13B does not privatize local accesses. This can be accomplished by using certain compiler options. With the XL UPC Compiler, for example, a low optimization level can be used (e.g., -O0).

The method next invokes a profiling run of the complied application code 13C but on a smaller target configuration. During the profiling run time the tool 13D operates to monitor the assignment and de-reference events, and extracts a target thread identifier, tid, for each such event. The thread id determines whether and where a message will be sent. Note that in this example tid would be the same for a profiling run with the original configuration (not the reduced, smaller configuration).

Assume for convenience that the assignment of thread ids (tids) are in a block fashion (the assignment can follow any arbitrary function), that is, the t threads on node0 in FIG. 2 get id, 0, 1, ..., t−1, the t threads on node1 get id, t, t+1, ..., 2t−1, and so on. In this case then for an id tid, with the smaller configuration, it will fall to node tid/t1; for the original configuration, it will fall to node tid/t. Thus, the tool 13D can predict the remote access pattern for the larger configuration. Note this may also accommodate the case where an access from one thread to data is owned by a different thread on the same node.

An analysis of the communication time on each thread for the two configurations is as follows. Assuming that there are n accesses that are evenly distributed to each target thread, L is the latency and B is the bandwidth of the network:
 1. small configuration: n(p1−1)(L+1/B)/(T p1); and
 2. large configuration: n(p−1)(L+1/B)/(T p).

As the number of nodes increases, the remote access time increases for each thread. For the case where p1=1, there is no remote access at all with the profiling run. Note that the local access statistics can also be established.

To be useful during the performance analysis process it may be desirable to map the accesses back to the source code (program 15 in FIG. 3). Described below is one exemplary technique for performing this mapping. The exemplary technique is provided in the non-limiting example of the XL UPC compiler (compiler 13B). For other compilers that implement GASP a similar mechanism can be used.

With regard now to mapping remote accesses, with the XL UPC compiler (as one non-limiting example of the compiler 13B in FIG. 3) a runtime transport function is invoked for each remote memory access. Tracing remote memory accesses can be performed by intercepting transport functions through the use of a weak symbol mechanism. For example, assume that a remote_get function fetches data from a remote node. At runtime the remote_get is defined as a 'weak symbol' as follows so that the linker may use_remote_get if remote_get is not defined, thereby avoiding linker errors.

pragma weak remote_get=_remote_get

A runtime library defines_remote_get, and a profiling library defines remote_get. The remote_get function captures runtime statistics including the time spent, an amount of data transferred, the source and the target of the transfer for the_remote_get in addition to calling_remote_get for the actual data transfer. This mechanism is similar to that found in MPI profiling.

As each transport function specifies a remote node and a shared variable described by a handle argument, the communication statistics can be attributed to handles (but not yet to the source).

To identify the source lines associated with the communication, there is an ability to walk the stack frames of a profiled transport function. The stack walk stops at the first ancestor whose call site in the source can be determined. Debugging information from the compiler 13B relative to the UPC source 15 is used to accomplish such mapping, and additional bookkeeping may be needed to determine the shared variables involved in the communication.

Recall that the weak symbol profiling captures communication statistics for each handle. Depending on how the handles are created during runtime they can be mapped to the shared UPC data structures in at least two ways.

(a) For shared variables allocated at compile time (e.g., global shared variables), the compiler 13B creates temporary variables during the intermediate translation to store the handles. The naming of the variables contains information that can be used to recover the original data structures in the UPC source program 15. The binary can be instrumented with psigma and intercept the handle allocation routine. Reference with regard to psigma can be made to S. Sbaraglia, K. Ekanadham, S. Crea, Seetharami Seelam, pSigma: An infrastructure for parallel application performance analysis using symbolic specifications. In *Proc. of the sixth European Workshop on OpenMP,* 2004. The handle value for the remote access and the address of the corresponding temporary variable are captured and inserted into a hash table during execution. At exit, the mapping between the communication to the source variable is established. The conceptual process is as follows:

{remote access}→{handle}→{temporary variable}→{UPC variable}.

For those variables dynamically allocated with {upc_alloc} or {upc_all_alloc}, their handles do not have associated intermediate variables. The tool 13D associates remote accesses to the source lines where the variables are allocated. To perform this task the tool 13D first analyzes the binary and captures the call sites of each shared memory allocation function. The tool 13D then assigns a unique ID (for example, the corresponding binary address) for each call site. The call sites then can be mapped using debugging information to the UPC lines. The binary is then instrumented, and during runtime there is established the link between the handle value and the call site ID. Thus, each handle value can be mapped to the binary address of the allocation call site and then to the source line. A simple parsing of the source line suffices to recover the UPC variable associated with the allocation. Conceptually, the process is as follows:

{remote access}→{handle}→{binary address}→{source line}→{UPC variable}.

The foregoing discussion was made with respect to mapping remote accesses. Discussed now is a procedure for tracking or local memory accesses.

Local accesses to shared memory eventually become regular accesses to local data. Whenever possible an optimizing compiler should attempt to use a private pointer instead of a shared pointer to access local data. Detecting a large number of local accesses to shared memory may signify privatization opportunity for optimization.

In general tracking local memory accesses can be more complicated than tracking remote accesses. While the tool 13D could intercept all load and store instructions the overhead can be large as accesses to private data are also instrumented.

The tool 13D intercepts all variants of {upc_assign} and {upc_deref} function calls generated by the compiler 13B for shared memory accesses. By inspecting the arguments of these function calls it is possible to determine whether the access is a local memory access or a remote memory access. If the access is local the corresponding statistics are captured.

If it is desirable to analyze the overall access pattern to shared memory then it is preferred that the compiler 13B does not privatize any of the accesses. This can performed, for example, with optimization O0, although the overhead is larger than with simple remote memory access.

The embodiments of this invention were tested using conventional benchmarks, such as NAS (NASA) SP (scalar penta-diagonal solver) and CG (conjugate gradient, irregular memory access and communication) using input S. A larger configuration uses 4 nodes and 8 nodes, and the tool 13D runs one node. For remote and local accesses the prediction was found to be 100% accurate for the larger configurations; that is, for the 4 node case and the 8 node case.

Figure 4:
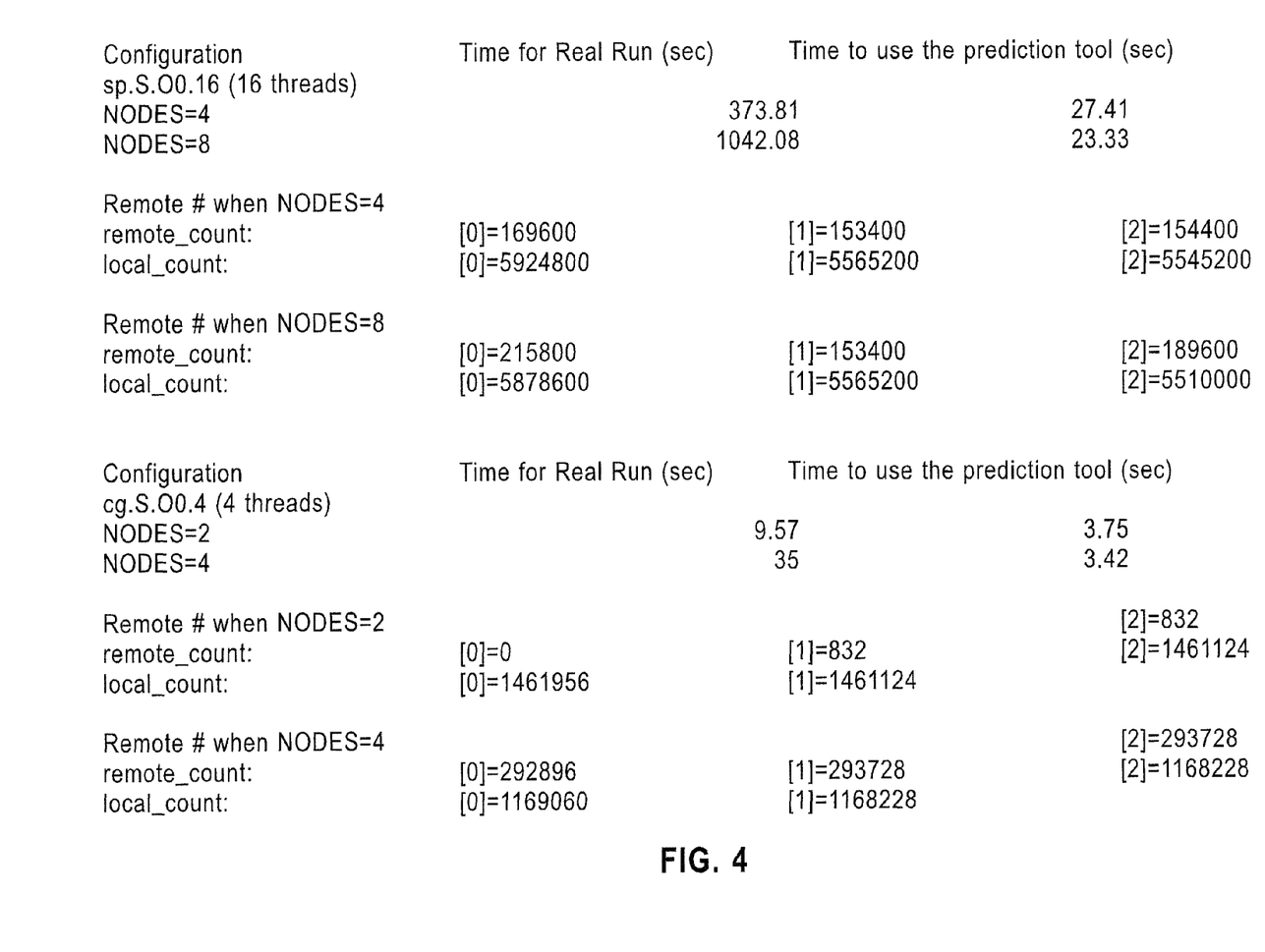
FIG. 4 shows an example of results obtained for SP and CG benchmark programs and contrasts the times required for a conventional run versus the times required when using the prediction tool in accordance with embodiments of this invention.

FIG. 4 shows an example of the results obtained for the SP and CG benchmark programs and contrasts the times required for a real run (a conventional run) and the times required when using the prediction tool 13D in accordance with embodiments of this invention. The significant reduction in the time required to make the analysis can be readily observed when the prediction tool 13D is employed.

The prediction runs much faster on the small configuration than the profiling run on the larger configurations. For example, for the SP benchmark with 8 nodes the speedup is 45 times faster to obtain the shared-memory access statistics than with a conventional profiling run. After the prediction run it is possible to optimize the application according to the analysis to achieve significant performance increases (e.g., up to 50 times speedup for CG).

With regard to other possible modeling extensions, when using the fast prediction made possible by the use of this invention network latency and bandwidth parameters can be inserted to estimate other metrics such as the communication time on larger configurations.

Figure 5:
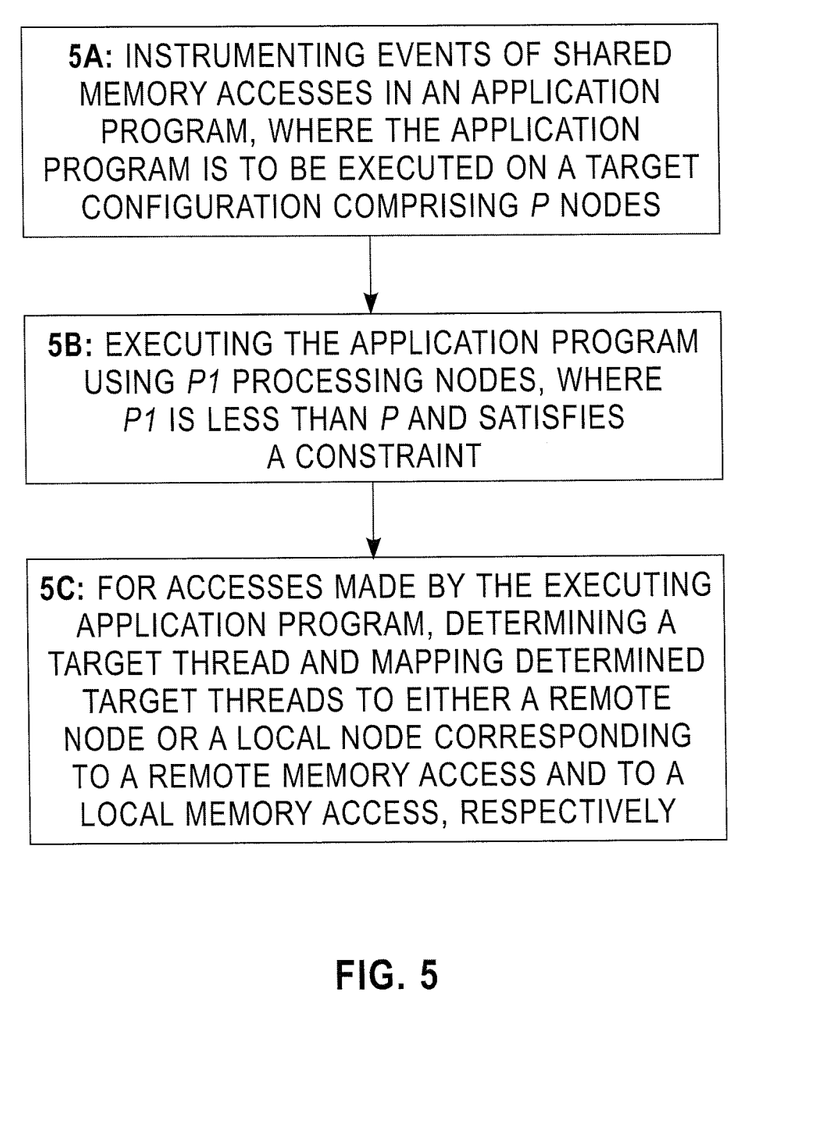
FIG. 5 is a logic flow diagram that illustrates the operation of a method, and a result of execution of computer program instructions embodied on a computer readable medium, in accordance with the exemplary embodiments of this invention.

FIG. 5 is a logic flow diagram that illustrates the operation of a method, and a result of execution of computer program instructions embodied on a computer readable medium, in accordance with the exemplary embodiments of this invention. The method may be considered to be a computer implemented method to analyze shared memory accesses during execution of an application program. At Block 5A there is a step of instrumenting events of shared memory accesses in the application program, where the application program is to be executed on a target configuration comprising p nodes. At Block 5B there is a step of executing the application program using p1 processing nodes, where p1 is less than p and satisfies a constraint. At Block 5C there is a step of, for accesses made by the executing application program, determining a target thread and mapping determined target threads to either a remote node or a local node corresponding to a remote memory access and to a local memory access, respectively.

In the operation of the method, and in accordance with result of execution of the computer program instructions, the application program is written in a programming language compliant with a partitioned global address space paradigm.

In the operation of the method, and in accordance with result of execution of the computer program instructions, the programming language is Unified Parallel C (UPC).

In the operation of the method, and in accordance with result of execution of the computer program instructions, the step of instrumenting instruments a compiled version of the application program.

In the operation of the method, and in accordance with result of execution of the computer program instructions, the events comprise read from shared memory and write to shared memory.

In the operation of the method, and in accordance with result of execution of the computer program instructions, the events comprise upc pointer assignment and upc pointer dereference.

In the operation of the method, and in accordance with result of execution of the computer program instructions, the mapping step/process uses a weak symbol compiler mechanism and comprises mapping from a remote access back to an application program variable via a temporary variable, or for a case where the variable is dynamically allocated, maps from a remote access to an application program variable via a binary address and line of source code of the application program.

In the operation of the method, and in accordance with result of execution of the computer program instructions, the mapping step/process comprises intercepting shared memory access function calls generated by a compiler and analyzing arguments of the function calls to determine where the access is a remote access or a local access.

In the operation of the method, and in accordance with result of execution of the computer program instructions, each of the p nodes uses t threads, where a memory capacity of each node is M, an input size to each node is n and the input is evenly distributed amongst hardware threads of each of the p nodes, and comprising finding a configuration with p1 nodes with each of the p1 nodes running t1 threads, where n/p1<=M, where t1<t*alpha where alpha is a constant and * denotes multiplication, and where the constraint is a minimal value of p1 that satisfies p1>n/M, p1*t1=p*t, and t1<t*alpha.

In the operation of the method, and in accordance with result of execution of the computer program instructions as in the preceding paragraph, where there is a step of assigning thread ids (tids) such that the t threads on a first node are assigned tids of 0, 1, ..., t−1, and the t threads on a second node are assigned tids of t, t+1, ..., 2t−1, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, and evolutions of such languages such the UPC discussed above. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A computer implemented method to analyze shared memory accesses during execution of an application program, comprising:
   instrumenting events of shared memory accesses in the application program, where the application program is to be executed on a target configuration comprising p nodes;
   executing the application program using p1 processing nodes, where p1 is less than p and satisfies a constraint; and
   for accesses made by the executing application program, determining a target thread and mapping determined target threads to either a remote node or a local node corresponding to a remote memory access and to a local memory access, respectively;
   where instrumenting instruments a compiled version of the application program; and
   where mapping comprises intercepting shared memory access function calls generated by a compiler and analyzing arguments of the function calls to determine whether an access is a remote access or a local access.

2. The method as in claim 1, where the application program is written in a programming language compliant with a partitioned global address space paradigm.

3. The method as in claim 2, where the programming language is Unified Parallel C (UPC).

4. The method as in claim 3, where the events comprise upc pointer assignment and upc pointer de-reference.

5. The method as in claim 1, where the events comprise read from shared memory and write to shared memory.

6. The method as in claim 1, where mapping uses a weak symbol compiler mechanism and comprises mapping from a remote access back to an application program variable via a temporary variable, or for a case where the application program variable is dynamically allocated maps from a remote access to an application program variable via a binary address and line of source code of the application program.

7. The method as in claim 1, where each of the p nodes uses t threads, where a memory capacity of each node is M, an input size to each node is n and an input is evenly distributed amongst hardware threads of each of the p nodes, and comprising finding a configuration with p1 nodes with each of the p1 nodes running t1 threads, where $n/p1<=M$, where $t1<t*alpha$ where alpha is a constant and * denotes multiplication, and where the constraint is a minimal value of p1 that satisfies $p1>n/M$, $p1*t1=p*t$, and $t1<t*alpha$.

8. The method as in claim 7, further comprising assigning thread identifications (tids) such that t threads on a first node are assigned tids of 0, 1, . . . , t−1, and t threads on a second node are assigned tids of t, t+1, . . . , 2t−1, and so on.

9. A non-transitory machine-readable storage medium that stores a program of executable instructions, where execution of the program results in performing operations that comprise:
   instrumenting events of shared memory accesses in an application program, where the application program is to be executed on a target configuration comprising p nodes;
   executing the application program using p1 processing nodes, where p1 is less than p and satisfies a constraint; and
   for accesses made by the executing application program, determining a target thread and mapping determined target threads to either a remote node or a local node corresponding to a remote memory access and to a local memory access, respectively;
   where instrumenting instruments a compiled version of the application program; and
   where mapping comprises intercepting shared memory access function calls generated by a compiler and analyzing arguments of the function calls to determine whether an access is a remote access or a local access.

10. The non-transitory machine-readable storage medium as in claim 9, where the application program is written in a programming language compliant with a partitioned global address space paradigm.

11. The non-transitory machine-readable storage medium as in claim 10, where the programming language is Unified Parallel C (UPC).

12. The non-transitory machine-readable storage medium as in claim 11, where the events comprise upc pointer assignment and upc pointer de-reference.

13. The non-transitory machine-readable storage medium as in claim 9, where the events comprise read from shared memory and write to shared memory.

14. The non-transitory machine-readable storage medium as in claim 9, where mapping uses a weak symbol compiler mechanism and comprises mapping from a remote access back to an application program variable via a temporary variable, or for a case where the application program variable is dynamically allocated maps from a remote access to an application program variable via a binary address and line of source code of the application program.

15. The non-transitory machine-readable storage medium as in claim 9, where each of the p nodes uses t threads, where a memory capacity of each node is M, an input size to each node is n and an input is evenly distributed amongst hardware threads of each of the p nodes, and comprising finding a configuration with p1 nodes with each of the p1 nodes running t1 threads, where $n/p1<=M$, where $t1<t*alpha$ where alpha is a constant and * denotes multiplication, and where the constraint is a minimal value of p1 that satisfies $p1>n/M$, $p1*t1=p*t$, and $t1<t*alpha$.

16. The non-transitory machine-readable storage medium as in claim 15, further comprising assigning thread identifications (tids) such that t threads on a first node are assigned tids of 0, 1, . . . , t−1, and t threads on a second node are assigned tids of t, t+1, . . . , 2t−1, and so on.

17. A data processing system comprising at least one processor connected with at least one memory that stores a program of executable instructions, where execution of the program by said at least one processor results in performing operations that comprise:

instrumenting events of shared memory accesses of a compiled application program written in a programming language compliant with a partitioned global address space paradigm, where the application program is to be executed on a target configuration comprising p nodes and where the events comprise read from shared memory and write to shared memory;

executing the application program using p1 processing nodes, where p1 is less than p and satisfies a constraint; and for accesses made by the executing application program, determining a target thread and mapping determined target threads to either a remote node or a local node corresponding to a remote memory access and to a local memory access, respectively;

where instrumenting instruments a compiled version of the application program, and where execution of the program by said at least one processor when mapping the determined target threads uses a weak symbol compiler mechanism, intercepts shared memory access function calls generated by a compiler, and analyzes arguments of the function calls to determine whether an access is a remote access or a local access.

18. The data processing system as in claim 17, where each of the p nodes uses t threads, where a memory capacity of each node is M, an input size to each node is n and an input is evenly distributed amongst hardware threads of each of the p nodes, and where execution of the program by said at least one processor finds a configuration with p1 nodes with each of the p1 nodes running t1 threads, where $n/p1<=M$, where $t1<t*alpha$ where alpha is a constant and * denotes multiplication, and where the constraint is a minimal value of p1 that satisfies $p1>n/M$, $p1*t1=p*t$, and $t1<t*alpha$.

19. The data processing system as in claim 18, where execution of the program by said at least one processor further comprises assigning thread identifications (tids) such that t threads on a first node are assigned tids of 0, 1, . . . , t−1, and t threads on a second node are assigned tids of t, t+1, 2t−1, and so on.

20. The data processing system as in claim 17, where the programming language is Unified Parallel C (UPC).

21. The data processing system as in claim 17, where execution of the program by said at least one processor when mapping the determined target threads comprises mapping from a remote access back to an application program variable via a temporary variable, or for a case where the application program variable is dynamically allocated maps from a remote access to an application program variable via a binary address and line of source code of the application program.

* * * * *